US008018930B2

(12) United States Patent
Casaccia et al.

(10) Patent No.: US 8,018,930 B2
(45) Date of Patent: Sep. 13, 2011

(54) APPARATUS AND METHOD FOR RECEIVING PACKET DATA ON A SUBSET OF CARRIER FREQUENCIES IN A WIRELESS COMMUNICATION SYSTEM

(75) Inventors: Lorenzo Casaccia, Rome (IT); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1054 days.

(21) Appl. No.: 11/227,631

(22) Filed: Sep. 14, 2005

(65) Prior Publication Data

US 2006/0072567 A1    Apr. 6, 2006

Related U.S. Application Data

(60) Provisional application No. 60/615,235, filed on Oct. 1, 2004.

(51) Int. Cl.
*H04J 1/00* (2006.01)
*H04W 4/00* (2009.01)

(52) U.S. Cl. ........ 370/389; 370/328; 370/343; 455/422; 455/434

(58) Field of Classification Search .......... 370/328–343, 370/347–352, 432–464; 375/219–260, 132–148; 455/59–67, 101–135, 403–522
See application file for complete search history.

(56) References Cited

U.S. PATENT DOCUMENTS

| | | | |
|---|---|---|---|
| 5,228,029 A * | 7/1993 | Kotzin ............ | 370/331 |
| 5,408,496 A * | 4/1995 | Ritz et al. .......... | 375/132 |
| 5,504,783 A * | 4/1996 | Tomisato et al. ....... | 375/267 |
| 5,809,030 A * | 9/1998 | Mestdagh et al. ....... | 370/480 |
| 6,246,713 B1 * | 6/2001 | Mattisson ............ | 375/132 |
| 6,351,473 B1 * | 2/2002 | Reusens et al. ........ | 370/480 |
| 6,826,402 B1 * | 11/2004 | Tran ............... | 455/438 |
| 6,882,681 B2 * | 4/2005 | Sano .............. | 375/148 |
| 7,120,437 B2 | 10/2006 | Benson et al. | |
| 7,154,955 B2 * | 12/2006 | Suwa et al. .......... | 375/260 |
| 7,272,162 B2 * | 9/2007 | Sano et al. .......... | 375/135 |
| 7,385,953 B2 * | 6/2008 | Ho et al. ........... | 370/330 |
| 7,386,306 B2 * | 6/2008 | Laroia et al. ........ | 455/422.1 |
| 7,436,857 B2 * | 10/2008 | Fong et al. .......... | 370/498 |
| 7,454,212 B2 * | 11/2008 | Li et al. ........... | 455/450 |
| 7,483,472 B2 * | 1/2009 | Oh et al. ........... | 375/132 |

(Continued)

FOREIGN PATENT DOCUMENTS

EP    1330045    7/2003

(Continued)

OTHER PUBLICATIONS

International Search Report—PCT/US05/035576, International Search Authority—European Patent Office, Feb. 14, 2006.

(Continued)

*Primary Examiner* — M. Phan
(74) *Attorney, Agent, or Firm* — D. Scott Juneau

(57) ABSTRACT

A remote station for a wireless communication system including a base station is disclosed. The remote station includes a front end structure configured to receive packet data in parallel on a subset of carrier frequencies. Each packet data is preceded by a header field for identifying the remote station as the recipient of the packet data and the subset of carrier frequencies is based on a set of a corresponding number of multiple carrier frequencies.

14 Claims, 7 Drawing Sheets

U.S. PATENT DOCUMENTS

| | | | | |
|---|---|---|---|---|
| 7,542,504 B2 * | 6/2009 | Chang et al. | | 375/132 |
| 2001/0024427 A1 | 9/2001 | Suzuki | | |
| 2004/0170136 A1 * | 9/2004 | Woo et al. | | 370/320 |
| 2005/0238083 A1 | 10/2005 | Laroia et al. | | |
| 2005/0250469 A1 * | 11/2005 | Laroia et al. | | 455/403 |
| 2005/0250502 A1 * | 11/2005 | Laroia et al. | | 455/447 |
| 2006/0002452 A1 | 1/2006 | Laroia et al. | | |
| 2006/0013182 A1 * | 1/2006 | Balasubramanian et al. | | 370/343 |
| 2006/0050625 A1 * | 3/2006 | Krasner | | 370/208 |
| 2008/0144572 A1 * | 6/2008 | Makhijani | | 370/330 |
| 2008/0287130 A1 * | 11/2008 | Laroia et al. | | 455/436 |

FOREIGN PATENT DOCUMENTS

| | | |
|---|---|---|
| EP | 1794970 | 6/2007 |
| JP | 4269041 | 9/1992 |
| JP | 2000132712 | 11/2000 |
| JP | 2001238269 | 8/2001 |
| JP | 2001358694 A | 12/2001 |
| JP | 2001358695 | 12/2001 |
| JP | 2002-135230 | 5/2002 |
| JP | 2003348047 | 12/2003 |
| JP | 2004096445 A | 3/2004 |
| JP | 2004104574 | 4/2004 |
| WO | 0235726 | 5/2002 |
| WO | WO2006039681 | 4/2006 |

OTHER PUBLICATIONS

Written Opinion—PCT/US05/035576, International Search Report Authority—European Patent Office, Feb. 14, 2006.

International Preliminary Report on Patentability—PCT/US05/035576, The International Bureau of WIPO—Geneva, Switzerland, Apr. 3, 2007.

* cited by examiner

APPARATUS AND METHOD FOR RECEIVING PACKET DATA ON A SUBSET OF CARRIER FREQUENCIES IN A WIRELESS COMMUNICATION SYSTEM

CLAIM OF PRIORITY UNDER 35 U.S.C. §119

The present Application for Patent claims priority to Provisional Application No. 60/615,235 entitled "Advance Hopping and Selection Scheme for GERAN" filed Oct. 1, 2004, and assigned to the assignee hereof and hereby expressly incorporated by reference herein.

BACKGROUND

1. Field

The present invention relates generally to wireless communication, and more specifically to cellular wireless communication.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

Frequency hopping is a technique employed in a number of communication systems to provide frequency diversity over time. A frequency hopping system transmits on a different (usually narrowband) carrier (also referred to herein as "carrier frequency") during every transmission unit or slot. The sequence of the carriers that are employed (hopping sequence) is usually such that hops between non-contiguous frequencies are performed, in order to better combat frequency-selective fading. An example of a system employing frequency hopping is GSM/GPRS/EDGE (also referred to as GERAN).

Channel quality estimation, which includes signal strength measurements, is one of the key characteristics of those systems employing a fast feedback scheme, which then exploits multi-user diversity. In such systems, the receivers estimate the quality of their reception from a base station according to some predefined metric (e.g. C/I strength). This is generally performed after a beacon or pilot is measured. The beacon or pilot can be non-intermittently (CDM or Code Division Multiplex) or intermittently (TDM or Time Division Multiplex) transmitted by the base station. The receivers report the measured quality to the base station with appropriate messages or indications. The base station can then exploit this information to schedule subsequent transmissions, in a fashion that is depending on the details of the scheduling algorithm employed by the network itself. In particular, the network can use this information to schedule a transmission towards the user experiencing the best channel conditions (multi-user diversity), or adapting the modulation and coding to the channel conditions of the selected user (fast link adaptation).

The mechanism described above generally relies on the fact that the system employs the same carrier. In other words, the measurement process performed by a receiver takes place on the same frequency that is used for subsequent scheduled transmissions. This is one of the requirements for the scheduling process to be able to take into account the received reports. This requirement cannot be fulfilled in most frequency hopped systems. In such systems, beacon measurements and scheduled transmissions would often be on separate, uncorrelated carriers. Even if the channel is correlated (hopping within the channel coherence bandwidth), the interference could be drastically different from one carrier to another. Therefore, the reporting-scheduling process would not be able to exploit the selectivity of fading/interference thus providing the corresponding gain. Such a limitation is illustrated in FIG. 8 in which a remote station's receiver receives data 800 on carrier 1 in frame 2 and then hops to carrier 2 in frame 2 to receive data 802.

SUMMARY

In one aspect, a remote station for a wireless communication system is disclosed. The remote station includes a front end structure configured to receive packet data in parallel on a subset of carrier frequencies. Each packet data is preceded by a header field for identifying the remote station as the recipient of the packet data and the subset of carrier frequencies is based on a set of a corresponding number of multiple carrier frequencies.

In another aspect, an apparatus for a wireless communication system including a remote station is disclosed. The apparatus includes a control processor configured to select a set of carrier frequencies for transmission to the remote station, each carrier frequency for carrying a beacon signal, receive multiple channel quality reports from the remote station based on the beacon signals, and select a subset of carrier frequencies from the set of carrier frequencies based on the channel quality reports, the subset of carrier frequencies for carrying packet data in parallel to the remote station, each packet data being preceded by a header field for identifying the remote station as the recipient of the packet data.

In yet another aspect, a method for receiving packet data on a remote station over a wireless communication system is disclosed. The method includes receiving multiple beacon signals in parallel, each beacon signal being received on a separate carrier frequency, the separate carrier frequencies defining a set of carrier frequencies, measuring a channel quality based on each beacon signal, transmitting each measured channel quality, and after transmitting each measured channel quality, receiving packet data in parallel on a subset of carrier frequencies, each packet data being preceded by a header field for identifying the remote station as the recipient of the packet data, wherein the subset of carrier frequencies is based on the set of carrier frequencies.

In yet another aspect, a machine-readable medium comprising instructions, the instructions when executed by the machine, cause the machine to perform operations is disclosed. The operations include receiving multiple beacon signals in parallel, each beacon signal being received on a separate carrier frequency, the separate carrier frequencies defining a set of carrier frequencies, measuring a channel quality based on each beacon signal, transmitting each measured channel quality, and after transmitting each measured channel quality, receiving packet data in parallel on a subset of carrier frequencies, each packet data being preceded by a header field for identifying the remote station as the recipient of the packet data, wherein the subset of carrier frequencies is based on the set of carrier frequencies.

In yet another aspect, a remote station for a wireless communication system is disclosed. The remote station includes means for receiving multiple beacon signals in parallel on a corresponding number of multiple carrier frequencies, means for measuring a channel quality based on each beacon signal, means for sending the measured channel qualities, means for receiving packet data in parallel on a subset of carrier frequencies, each packet data being preceded by a header field for identifying the remote station as the recipient of the packet data, wherein the subset of carrier frequencies is based on a set of the corresponding number of multiple carrier frequencies.

In yet another aspect, an apparatus for a wireless communication system including a remote station is disclosed. The apparatus includes means for selecting a set of carrier frequencies for transmission to the remote station, each carrier frequency for carrying a beacon signal, means for receiving multiple channel quality reports from the remote station based on the beacon signals, and means for selecting a subset of carrier frequencies from the set of carrier frequencies based on the channel quality reports, the subset of carrier frequencies for carrying packet data in parallel to the remote station, each packet data being preceded by a header field for identifying the remote station as the recipient of the packet data.

In yet another aspect, an apparatus for a wireless remote station is disclosed. The apparatus includes a front end structure configured to receive packet data in parallel on a subset of carrier frequencies, each packet data being preceded by a header field for identifying the wireless remote station as the recipient of the packet data, wherein the subset of carrier frequencies is based on a set of a corresponding number of multiple carrier frequencies.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as an access terminal (AT), user equipment or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
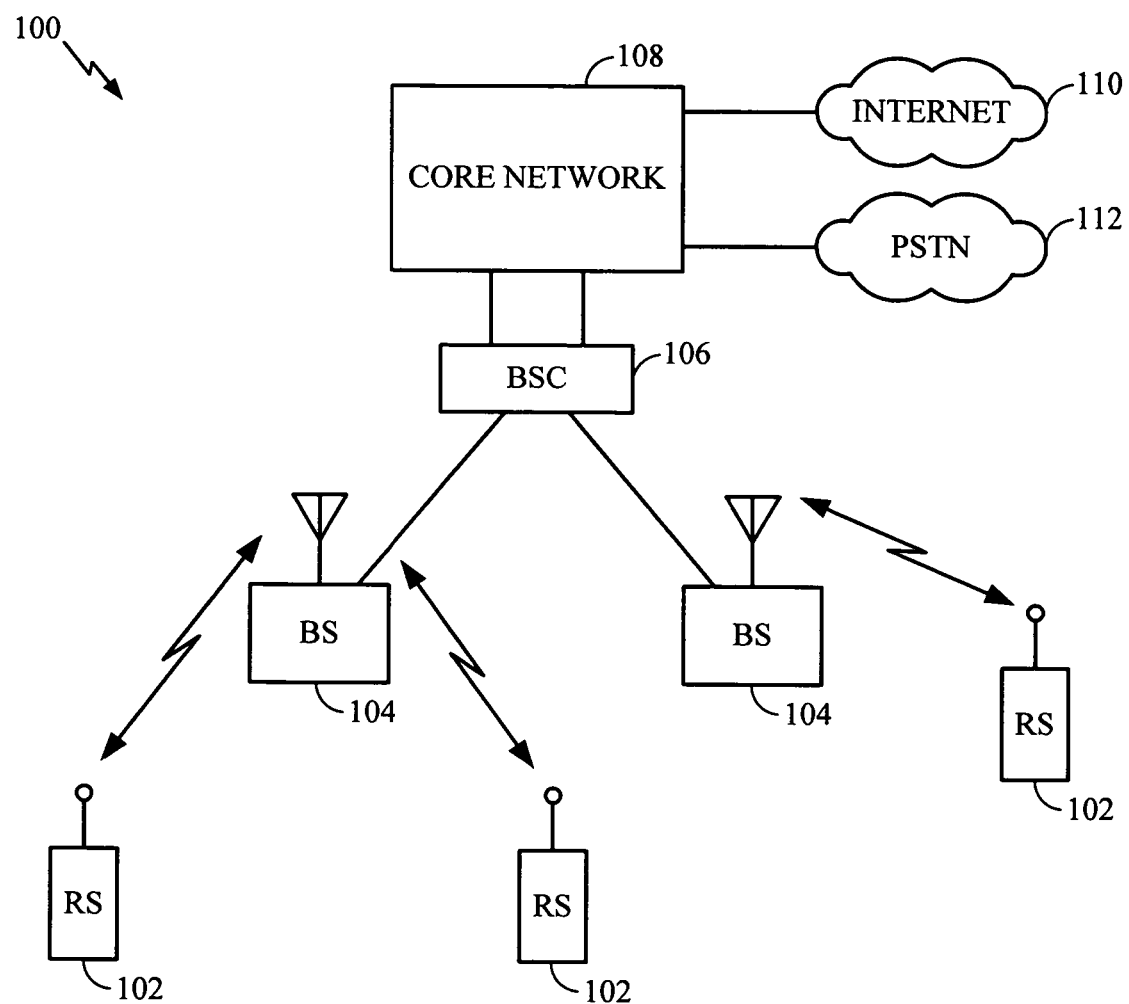
FIG. 1 is an example of a wireless communication system.

With reference to FIG. 1, an exemplary wireless communication system 100 includes one or more remote stations (RS) 102, one or more base stations (BS) 104, one or more base station controllers (BSC) 106, and a core network 108. Core network may be connected to an Internet 110 and a Public Switched Telephone Network (PSTN) 112 via suitable backhauls. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 2A:
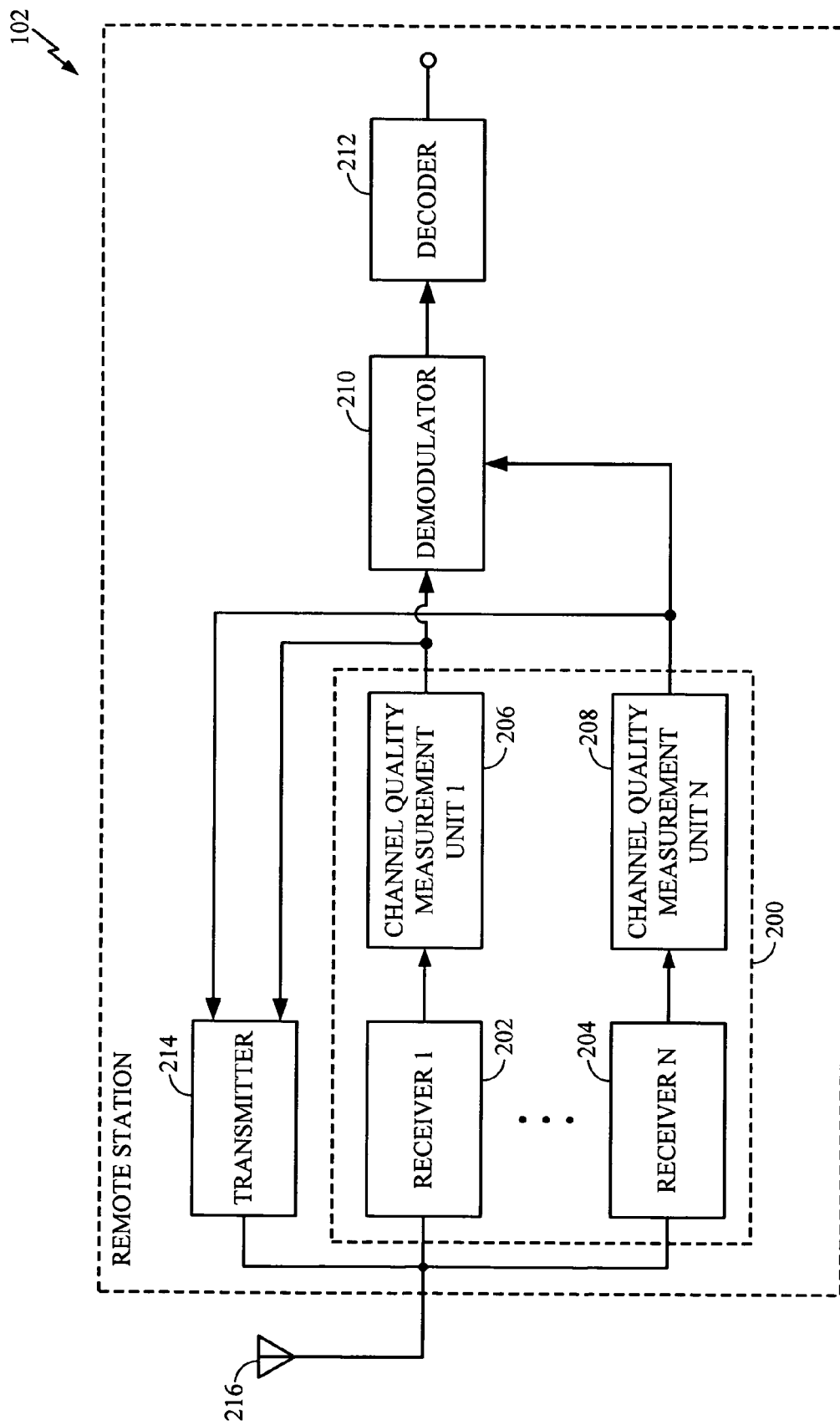
FIG. 2A is a remote station in accordance with an embodiment of the present invention.
Figure 6:
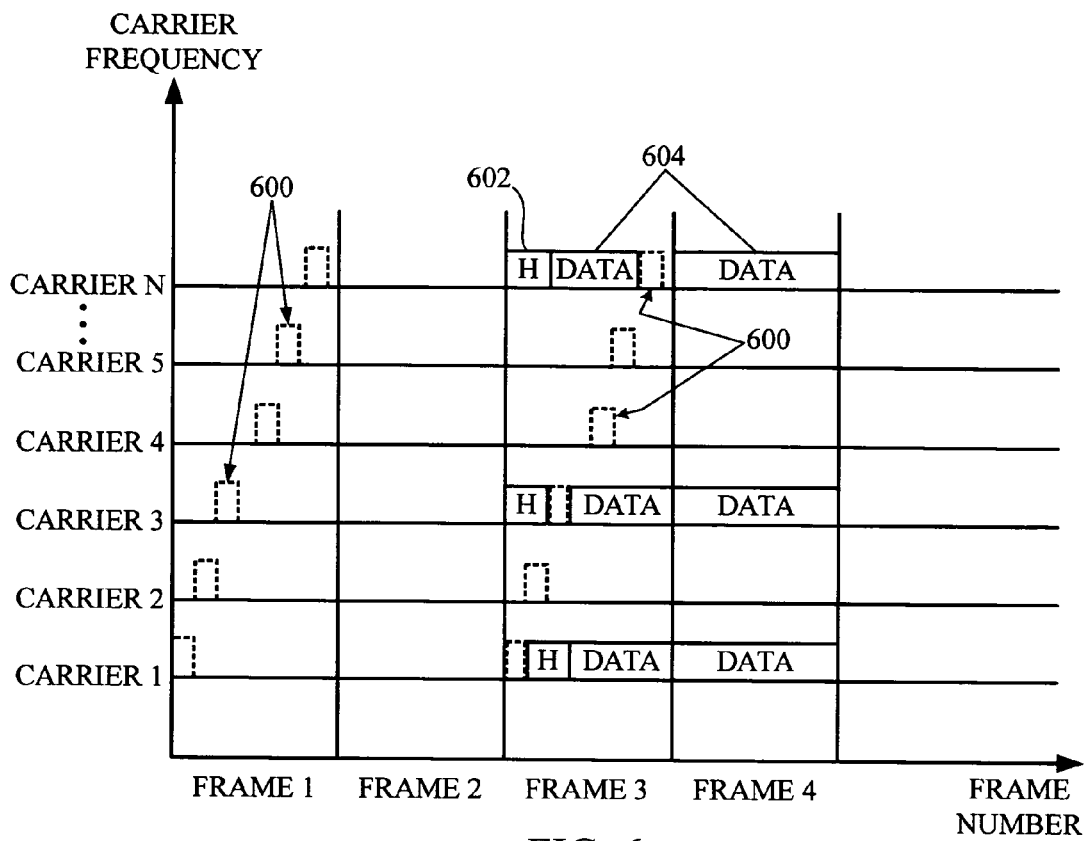
FIG. 6 is a diagram of multiple carrier frequencies as a function of frame number in accordance with an embodiment of the present invention.

With reference to FIGS. 2A and 6, in one embodiment, a remote station 102 for a wireless communication system 100 is shown. Remote station 102 includes a front end structure 200 configured to receive packet data 604 in parallel on a subset of carrier frequencies (e.g., carriers 1, 3, and N). Each packet data is preceded by a header field 602 for identifying remote station 102 as the recipient of packet data 604 and the subset of carrier frequencies is based on a set (e.g., carrier 1 ... carrier N) of a corresponding number of multiple carrier frequencies.

Continuing with FIG. 2A, front end structure 200 is further configured to receive multiple beacon signals 600 in parallel on a corresponding number of multiple carrier frequencies (carrier 1 ... carrier N), measure a channel quality based on each beacon signal, and send the measured channel qualities. In one embodiment, the measured channel qualities are sent to a base station. Remote station 102 includes a transmitter 214, a demodulator 210, a decoder 212, and an antenna 216 for wireless communication. Other functional blocks such as a control processor, modulator, encoder, etc. which are typically included in a remote station are not shown to simplify the explanation of aspects of the present invention. Front end structure 200 includes N plurality of receivers 202, 204 in parallel coupled to N plurality of channel quality measurement units 206, 208, where the integer N may be greater than 1. Each receiver is configured to receive a respective one of the set of multiple carrier frequencies. For example, receiver 1 (202) is configured to receive carrier 1 as shown in FIG. 6.

Figure 2B:
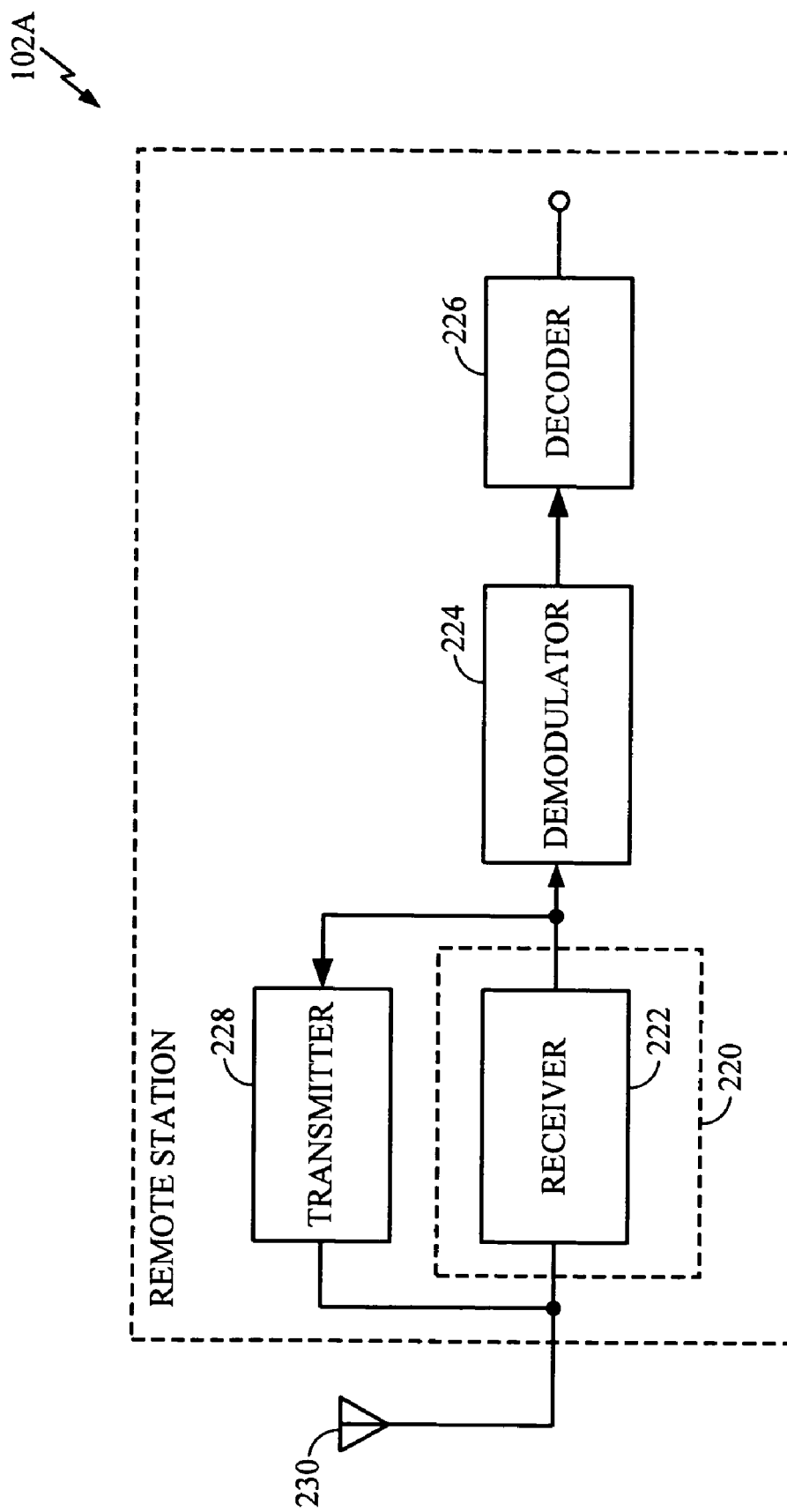
FIG. 2B is a remote station in accordance with another embodiment of the present invention.

With reference to FIG. 2B, a remote station 102A in accordance with another embodiment of the present invention includes an antenna 230, a front end structure 220 including a receiver 222, a demodulator 224, a decoder 226, and a transmitter 228. In one embodiment, receiver 222 is configured to receive the set of multiple carrier frequencies in parallel, as shown, for example, in FIG. 6 as a set of N carrier frequencies. Suitably, receiver 222 may be configured as a single digital receiver for filtering each respective carrier frequency and for making suitable channel measurements to determine the quality of each channel, to be described in more detail later.

Figure 3:
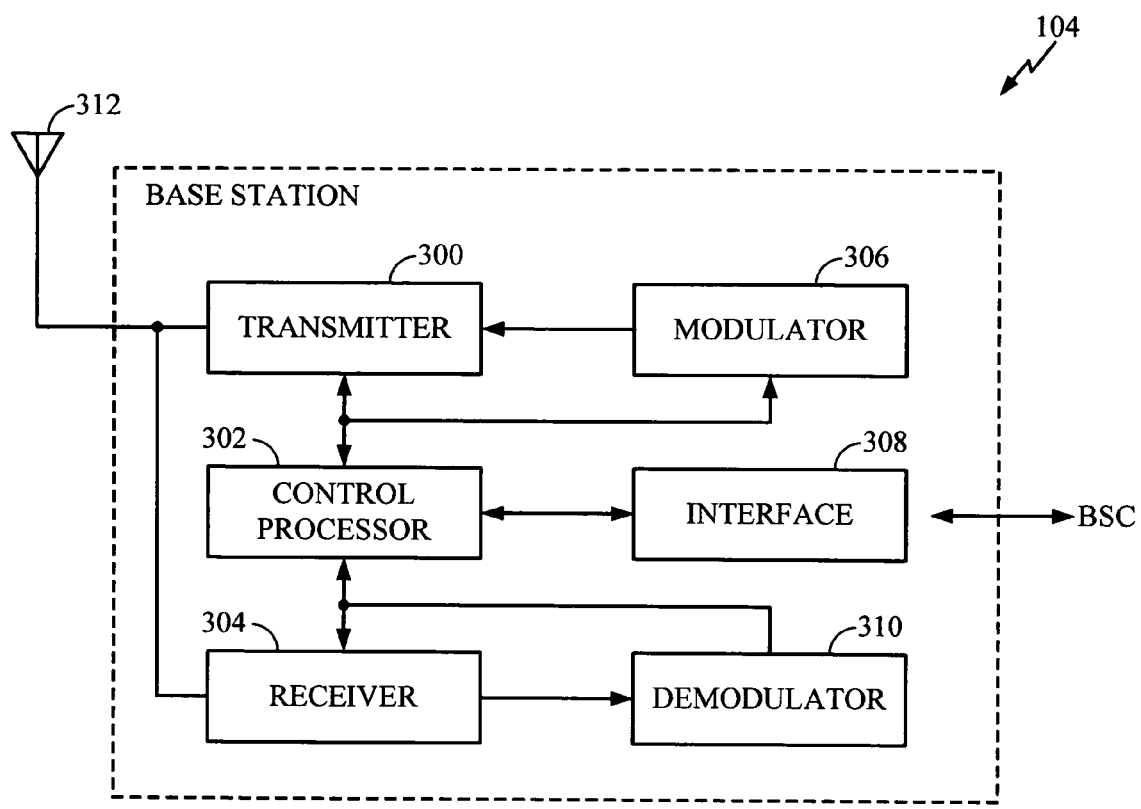
FIG. 3 is a base station in accordance with an embodiment of the present invention.

With reference to FIGS. 3 and 6, in one embodiment, an apparatus for a wireless communication system including a remote station is shown. The apparatus includes a control processor 302 configured to select a set of carrier frequencies (e.g., the N carrier frequencies shown in FIG. 6) for transmission to the remote station, each carrier frequency for carrying a beacon signal 600, receive multiple channel quality reports from the remote station based on the beacon signals, and select a subset of carrier frequencies (e.g., carriers 1, 3, and N as shown in FIG. 6) from the set of carrier frequencies based on the channel quality reports, the subset of carrier frequencies for carrying packet data 604 in parallel to the remote station, each packet data being preceded by a header field 602 for identifying the remote station as the recipient of the packet data. In one embodiment the apparatus is a base station as shown in FIG. 3. In another embodiment, the apparatus is a base station controller.

Figure 5:
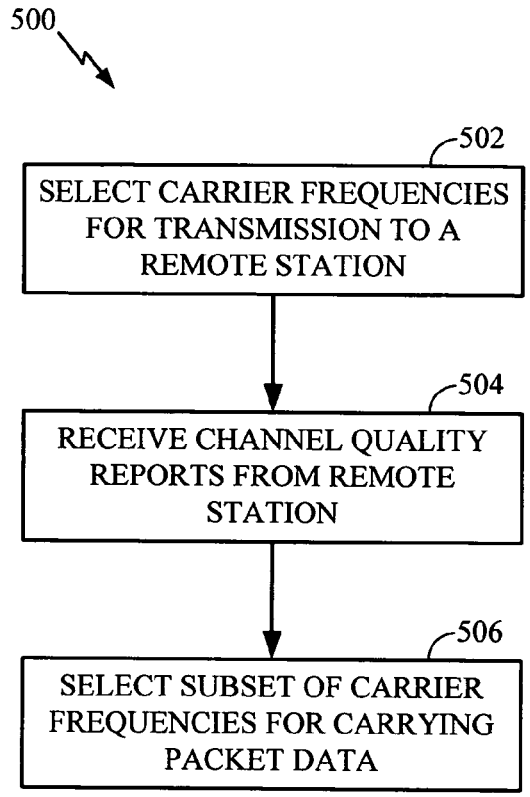
FIG. 5 is a flow diagram of a process which may be used in conjunction with an apparatus for a wireless communication system in accordance with an embodiment of the present invention.

With reference to FIG. 5, a flow diagram of a process 500 is shown in accordance with an embodiment of the present invention. Such a process 500 may be implemented by a control processor, such as control processor 302 shown in FIG. 3. Process 500 includes at 502, selecting carrier frequencies for transmission to a remote station, such as remote station 102 or 102A (see FIGS. 2A, 2B) and at 504, receiving channel quality reports or measurements from the remote station. A ranking of the carriers by the remote station may also be received. After receiving the channel quality reports and/or ranking of the carriers, a subset of carrier frequencies, as previously described, is selected based on the received channel quality reports and/or ranking of the carriers. The subset of carrier frequencies is used to carry packet data to the remote station at 506.

Figure 4:
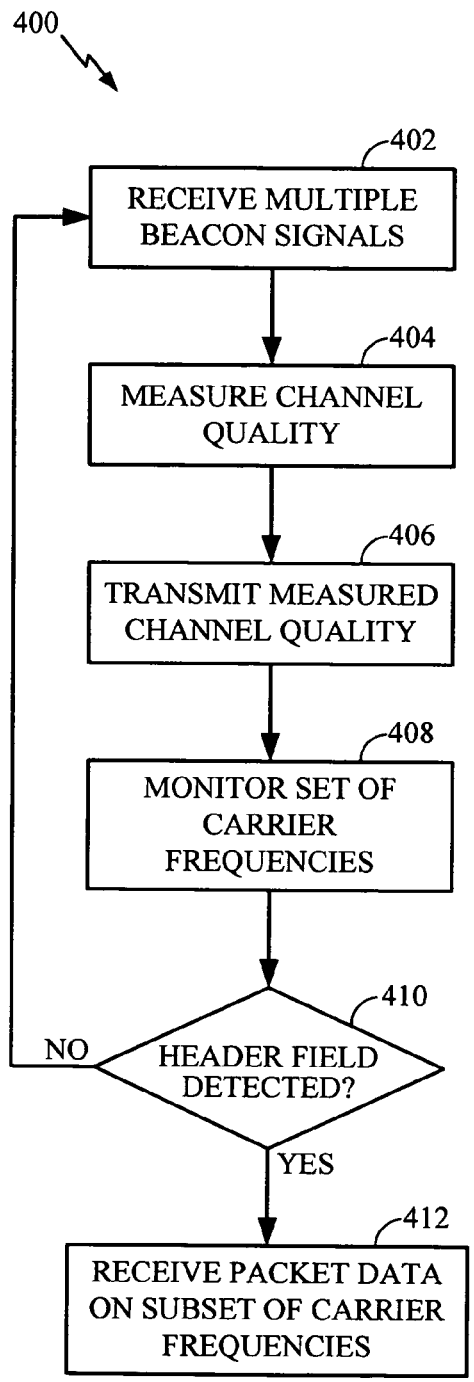
FIG. 4 is a flow diagram of a process which may be used in conjunction with a remote station in accordance with an embodiment of the present invention.

With reference to FIGS. 4 and 6, a flow diagram of a process 400 is shown in accordance with an embodiment of the present invention. Such a process 400 may be implemented by a remote station, such as remote station 102 shown in FIG. 2A. At 402, remote station 102 receives in frame 1 multiple beacon or pilot signals 600 carried on a set of multiple carrier frequencies or carriers 1 to N. At 404, the channel qualities associated with each beacon signal are measured based on a suitable metric and the carriers may be ranked according to the metric during frame 2. For example, a suitable metric may be the channel quality indicator (CQI) or C/I ratio which is a measure of the carrier signal strength relative to interference. At 406, the measured channel qualities and/or the ranking of the carriers are transmitted to a base station and thereafter, at 408, remote station 102 continues to monitor the set of carrier frequencies. At 410, a determination is made whether or not a header field 602 is detected. If header field 602 is not detected, then remote station may continue to receive beacon signals 600. If header field 602 is detected, then at 412, packet data 604 is received on a subset of carrier frequencies associated with the header field(s).

In one embodiment, the subset of carrier frequencies (e.g., carriers 1, 3, and N) is those carriers selected by the access network based on the transmitted channel quality measurements. For example, in FIG. 6, header fields 602 are detected on carriers 1, 3, and N in frame 3. Such header fields include control information which identifies remote station 102 as the recipient of the subsequent packet data 604. In addition, header field 602 includes control information related to the length of packet data 604 and in the embodiment shown in FIG. 6, the length of each packet data 604 spans two frames, frames 3 and 4. In frame 4, remote station 102 focuses only on the selected carriers (i.e., subset of carrier frequencies) for packet data reception. In parallel with the packet data reception, remote station 102 monitors beacon signals 600 on the set of carriers for the next reporting of channel quality. As shown in FIG. 6, such monitoring of beacon signals 600 can occur in parallel with the above described packet data reception, e.g., in frame 3, or after the packet data reception has been completed, depending on the periodicity of the transmission of the beacon signals 600 by the access network, e.g., the base station. After the next reporting of channel quality, remote station 102 may receive packet data on the same subset of carrier frequencies or a different subset of carrier frequencies dependent on the transmitted channel qualities. For example, in subsequent frames, remote station 102 may detect header fields 602 on carriers 2, 3, and 4.

Figure 7:
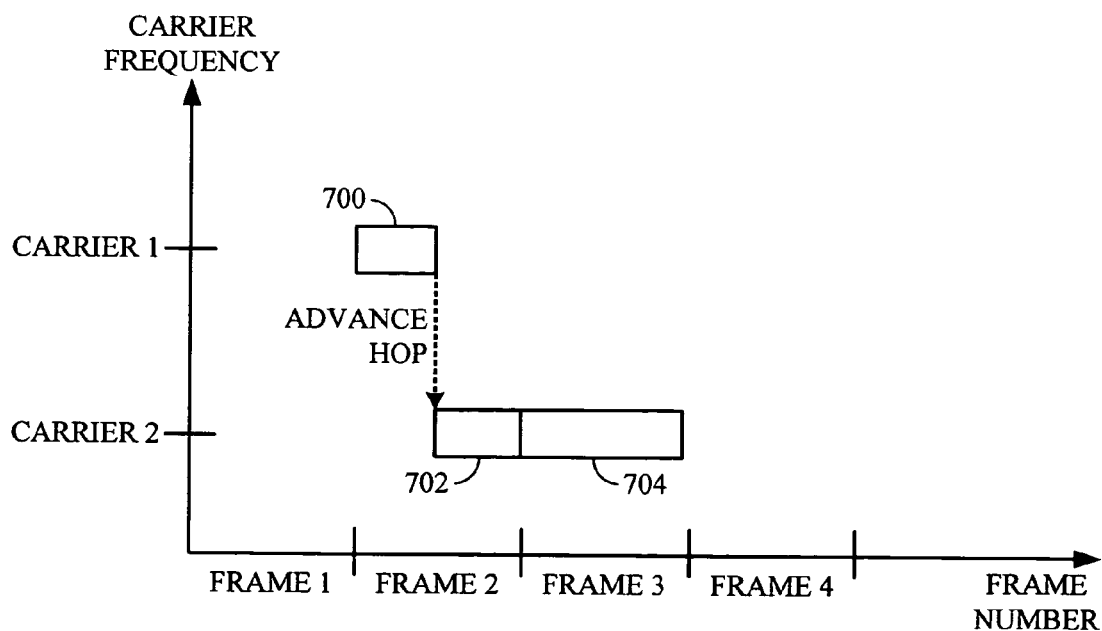
FIG. 7 is a diagram of multiple carrier frequencies as a function of frame number in accordance with a frequency hopping embodiment of the present invention
Figure 8:
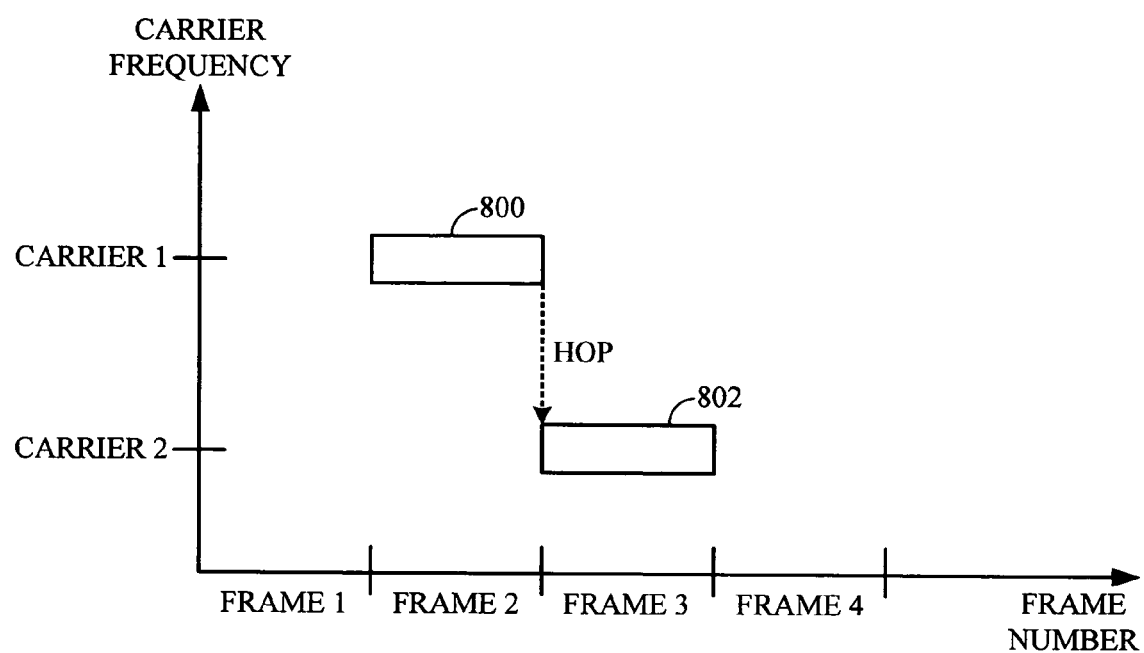
FIG. 8 is a diagram of multiple carrier frequencies as a function of frame number according to the prior art.

With reference to FIG. 7, a frequency hopping scheme in accordance with an embodiment of the present invention is shown in which two carriers are shown merely for illustrative purposes. A remote station, such as remote station 102 or 102A shown in FIGS. 2A and 2B, receives on carrier 1 during frame 2. During frame 2, the remote station hops to carrier 2 according to a predefined frequency hopping sequence and measures the channel quality over carrier 2 and reports the channel quality to the access network. The access network may then send a next transmission of the packet data to the remote station over carrier 2 based on the measured channel quality.

The frequency hopping scheme can be extended to an N number of carriers, where N is greater than 1 and an embodiment of which will be described with reference to FIGS. 2A and 6. As shown in FIG. 6, remote station 102 receives packet data initially on carriers 1, 3, and N based on the previously transmitted channel quality measurements. As such, remote station 102 includes a first group of receivers (e.g., receivers 1, 3, and N) and a second group of receivers (e.g., receivers 2, 4, and 5), the first group of receivers configured to receive the packet data in parallel on the subset of carrier frequencies (e.g., carriers 1, 3, and N). Furthermore, each one of the second group of receivers may be configured to hop to another carrier frequency in accordance with a suitable frequency hopping sequence. For example, receiver 2 may be configured to hop to a carrier N+1 outside of the set of carriers shown in FIG. 6 and perform channel estimation over that new carrier. In accordance with another embodiment of the present invention, receiver 222 of remote station 102A may be configured to receive the packet data in parallel on the subset of carrier frequencies and hop to other carrier frequencies outside of the set of carriers shown in FIG. 6 and perform channel estimation over those new carriers.

In another aspect of the present invention, a machine-readable medium comprising instructions, the instructions when executed by the machine, cause the machine to perform operations is disclosed. The operations include receiving multiple beacon signals in parallel, each beacon signal being received on a separate carrier frequency, the separate carrier frequencies defining a set of carrier frequencies, measuring a channel quality based on each beacon signal, transmitting each measured channel quality, and after transmitting each measured channel quality, receiving packet data in parallel on a subset of carrier frequencies, each packet data being preceded by a header field for identifying the remote station as the recipient of the packet data, wherein the subset of carrier frequencies is based on the set of carrier frequencies. In one embodiment, the machine-readable medium may be a disk based medium such as a CD-ROM. In one embodiment, the instructions may be executed within a remote station.

In yet another aspect of the present invention, a remote station for a wireless communication system is disclosed. The remote station includes means for receiving multiple beacon signals in parallel on a corresponding number of multiple carrier frequencies, means for measuring a channel quality based on each beacon signal, means for sending the measured channel qualities, means for receiving packet data in parallel on a subset of carrier frequencies, each packet data being preceded by a header field for identifying the remote station as the recipient of the packet data, wherein the subset of carrier frequencies is based on a set of the corresponding number of multiple carrier frequencies. In one embodiment, the means for receiving multiple beacon signals may include multiple N receivers as shown in FIG. 2A or alternatively, may include receiver 222 as shown in FIG. 2B. In one embodiment, the means for measuring a channel quality may include N multiple channel quality measurement units as shown in FIG. 2A, or alternatively, may include a suitable digital circuit in receiver 222 of FIG. 2B. In one embodiment, the means for sending to the base station the measured channel qualities may include N multiple channel quality measurement units as shown in FIG. 2A, or alternatively, may include the suitable digital circuit in receiver 222 of FIG. 2B. In one embodiment, the means for receiving packet data may include multiple N receivers as shown in FIG. 2A or alternatively, may include receiver 222 as shown in FIG. 2B.

In yet another aspect of the present invention, an apparatus for a wireless communication system including a remote station is disclosed. The apparatus includes means for selecting a set of carrier frequencies for transmission to the remote station, each carrier frequency for carrying a beacon signal, means for receiving multiple channel quality reports from the remote station based on the beacon signals, and means for selecting a subset of carrier frequencies from the set of carrier frequencies based on the channel quality reports, the subset of carrier frequencies for carrying packet data in parallel to the remote station, each packet data being preceded by a header field for identifying the remote station as the recipient of the packet data. In one embodiment, the means for selecting a set of carrier frequencies may include control processor 302, the means for receiving multiple channel quality reports may include receiver 304, and the means for selecting a subset of carrier frequencies may include control processor 302, all of which is shown in FIG. 3. In another embodiment in which the apparatus is a base station controller, each of the above described means may be formed by a control processor, such as control processor 302.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A remote station for a wireless communication system, the remote station comprising:
a front end structure configured to:
receive packet data in parallel on a subset of carrier frequencies, each packet data being preceded by a header field for identifying the remote station as the recipient of the packet data;
receive multiple beacon signals in parallel on the corresponding number of multiple carrier frequencies;
measure a channel quality based on each beacon signal; and
send the measured channel qualities,
wherein the subset of carrier frequencies is based on a set of a corresponding number of multiple carrier frequencies.

2. The remote station of claim 1, wherein the front end structure includes:
a plurality of receivers in parallel, each receiver configured to receive a respective one of the set of multiple carrier frequencies.

3. The remote station of claim 1, comprising:
a single receiver configured to receive the set of multiple carrier frequencies in parallel.

4. The remote station of claim 1, wherein each header field includes information related to the length of the packet data.

5. The remote station of claim 2, wherein the plurality of receivers includes a first group of receivers and a second group of receivers, the first group of receivers configured to receive the packet data in parallel on the subset of carrier frequencies, each one of the second group of receivers configured to hop to another carrier frequency.

6. The remote station of claim 3, wherein the single receiver is configured to:
receive the packet data in parallel on the subset of carrier frequencies; and
hop to other carrier frequencies.

7. A method for receiving packet data on a remote station over a wireless communication system, the method comprising:
receiving multiple beacon signals in parallel, each beacon signal being received on a separate carrier frequency, the separate carrier frequencies defining a set of carrier frequencies;
measuring a channel quality based on each beacon signal;
transmitting each measured channel quality; and
after transmitting each measured channel quality:
receiving packet data in parallel on a subset of carrier frequencies, each packet data being preceded by a header field for identifying the remote station as the recipient of the packet data; and
while receiving the packet data on the subset of carrier frequencies:
hopping to other carrier frequencies,
wherein the subset of carrier frequencies is based on the set of carrier frequencies.

8. A non-transitory machine-readable storage medium comprising instructions, the instructions when executed by a wireless remote station, cause the wireless remote station to perform operations comprising:
receiving multiple beacon signals in parallel, each beacon signal being received on a separate carrier frequency, the separate carrier frequencies defining a set of carrier frequencies;
measuring a channel quality based on each beacon signal;
transmitting each measured channel quality; and
after transmitting each measured channel quality:
receiving packet data in parallel on a subset of carrier frequencies, each packet data being preceded by a header field for identifying the remote station as the recipient of the packet data; and
while receiving the packet data on the subset of carrier frequencies:
hopping to other carrier frequencies,
wherein the subset of carrier frequencies is based on the set of carrier frequencies.

9. The non-transitory machine-readable storage medium of claim 8, comprising:
while receiving the packet data on the subset of carrier frequencies:
hopping to other carrier frequencies.

10. A remote station for a wireless communication system, the remote station comprising:
means for receiving multiple beacon signals in parallel on a corresponding number of multiple carrier frequencies;
means for measuring a channel quality based on each beacon signal;
means for sending the measured channel qualities;
means for receiving packet data in parallel on a subset of carrier frequencies, each packet data being preceded by a header field for identifying the remote station as the recipient of the packet data;
means for hopping to other carrier frequencies: and
means for receiving packet data in parallel on the other carrier frequencies, each packet data being preceded by a header field for identifying the remote station as the recipient of the packet data,
wherein the subset of carrier frequencies is based on a set of the corresponding number of multiple carrier frequencies.

11. An apparatus for a wireless remote station, the apparatus comprising:
a front end structure configured to:
receive packet data in parallel on a subset of carrier frequencies, each packet data being preceded by a header field for identifying the wireless remote station as the recipient of the packet data;
receive multiple beacon signals in parallel on the corresponding number of multiple carrier frequencies;
measure a channel quality based on each beacon signal; and
send the measured channel qualities,
wherein the subset of carrier frequencies is based on a set of a corresponding number of multiple carrier frequencies.

12. The apparatus of claim 11, wherein the front end structure is further configured to:
hop to other carrier frequencies; and
receive packet data in parallel on the other carrier frequencies, each packet data being preceded by a header field for identifying the wireless remote station as the recipient of the packet data.

13. The method of claim 7, wherein the subset of carrier frequencies on which the packet data is received in parallel corresponds to frequencies that are hopped to by a base station transmitting the packet data in accordance with a frequency hopping sequence of the base station.

14. The method of claim 7, wherein the subset of carrier frequencies includes multiple carrier frequencies transmitted by the same base station.

* * * * *